(12) United States Patent
Furukawa et al.

(10) Patent No.: US 10,076,980 B2
(45) Date of Patent: Sep. 18, 2018

(54) VEHICLE SEAT

(71) Applicant: TOYOTA BOSHOKU KABUSHIKI KAISHA, Aichi-ken (JP)

(72) Inventors: Kenji Furukawa, Aichi-ken (JP); Makoto Esaki, Aichi-Ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 197 days.

(21) Appl. No.: 15/147,331

(22) Filed: May 5, 2016

(65) Prior Publication Data

US 2016/0325650 A1  Nov. 10, 2016

(30) Foreign Application Priority Data

May 8, 2015  (JP) .................................. 2015-095417

(51) Int. Cl.
  *B60N 2/75*  (2018.01)
  *B60N 2/46*  (2006.01)
(52) U.S. Cl.
  CPC ........... *B60N 2/4613* (2013.01); *B60N 2/757* (2018.02)
(58) Field of Classification Search
  CPC .... B60N 2/4613; B60N 2/4633; B60N 2/757; B60N 2/767
  USPC ....................... 297/411.39, 411.32
  See application file for complete search history.

(56) References Cited

U.S. PATENT DOCUMENTS

| | | | | |
|---|---|---|---|---|
| 4,400,033 A | * | 8/1983 | Pietsch ................ | A47C 1/03 297/115 |
| 4,435,011 A | * | 3/1984 | Hakamata ............ | B60N 2/4613 297/113 |
| 4,886,317 A | * | 12/1989 | Konzmann .............. | B60N 2/20 297/115 |
| 5,873,633 A | | 2/1999 | Lang et al. | |
| 6,220,616 B1 | * | 4/2001 | Finch ....................... | A61G 5/12 280/304.1 |

(Continued)

FOREIGN PATENT DOCUMENTS

| | | |
|---|---|---|
| CN | 101130344 | 2/2008 |
| CN | 202764753 | 3/2013 |

(Continued)

OTHER PUBLICATIONS

Chinese Office Action for CN App. No. 201610298382.X dated Nov. 16, 2017, along with English-language translation thereof.

*Primary Examiner* — David R Dunn
*Assistant Examiner* — Tania Abraham
(74) *Attorney, Agent, or Firm* — Greenblum & Bernstein, P.L.C.

(57) ABSTRACT

A vehicle seat includes: a seat back configured to be coupled with a vehicle body and to have backrest angle adjustable with respect to the vehicle body; a support shaft that is attached to the seat back and extends in a seat width direction an armrest that is coupled with the seat back to be pivotable about the support shaft and allowed to be pivotally extracted from the seat back to be in an extracted position and retracted to the seat back to be in a retracted position; and an extracted position retaining mechanism that retains the armrest in the extracted position when the armrest is extracted from the seat back to limit an angle of the armrest with respect to the vehicle body to be in a predetermined range while the backrest angle of the seat back is changed.

4 Claims, 8 Drawing Sheets

(56) References Cited

U.S. PATENT DOCUMENTS

| | | | | |
|---|---|---|---|---|
| 6,948,776 B1 * | 9/2005 | Harmon | ................... | B60N 2/01 297/411.39 |
| 8,328,286 B2 * | 12/2012 | Steury | ..................... | B60N 2/22 297/411.39 |
| 2008/0048477 A1 | 2/2008 | Ujimoto et al. | | |
| 2015/0001909 A1 | 1/2015 | Lorey | | |

FOREIGN PATENT DOCUMENTS

| | | |
|---|---|---|
| CN | 104249638 | 12/2014 |
| JP | 10-166919 | 6/1998 |
| JP | 2001-145540 | 5/2001 |
| JP | 3649974 | 2/2005 |
| JP | 5296507 | 9/2013 |

* cited by examiner

VEHICLE SEAT

CROSS-REFERENCE TO RELATED APPLICATION

This application claims priorities from Japanese Patent Application No. 2015-095417 filed on May 8, 2015, the entire subject matters of which is incorporated herein by reference.

TECHNICAL FIELD

The present disclosure relates to a vehicle seat. In more detail, the present disclosure relates to a vehicle seat having a seat back being connected with a vehicle body with adjustable backrest angle, an armrest being connected with the seat back in a state where the armrest is arranged to be retractable by a pivotal movement; and an extracted position retaining mechanism, keeping the armrest in its extracted position so that its angle variation relative to the vehicle body is limited even if the backrest angle of the seat back changes.

BACKGROUND

The configuration is conventionally known that an armrest is connected with a seat back of a vehicle seat in a state where the armrest is arranged to be pivotally retractable (for example, see JP-A-H10-166919). The armrest is configured in a way that a regulating position for extracted state changes as the seat back tilts, so that its extracted position can be maintained horizontal even if the backrest angle of the seat back tilts rearward. Particularly, the armrest is configured that its extracted position is regulated by abutting on a stretching link bridging the seat back and its supporting base. The stretching link changes a regulating position at which the armrest is abutted by changing its stretching angle in accordance with a movement of the seat back to change a backrest angle of the seat back.

However, in the related art, the vehicle seat is configured to abut the armrest on the stretching link having a predetermined stretching shape, a usage load of the armrest is likely to be applied to the stretching link as a bending load, which resulting in a configuration of a low structural strength. The present disclosure has been made to solve the above problem.

SUMMARY

The present disclosure is made in consideration of the above-mentioned circumstances, and one of objects of the present disclosure is to provide a vehicle seat having an extracted position retaining mechanism with high structural strength, which limits an angle variation of an extracted position of an armrest while a backrest angle of a seat back is changed.

According to an illustrative embodiment of the present disclosure, there is provided a vehicle seat including: a seat back configured to be coupled with a vehicle body and to have backrest angle adjustable with respect to the vehicle body; a support shaft that is attached to the seat back and extends in a seat width direction an armrest that is coupled with the seat back to be pivotable about the support shaft and allowed to be pivotally extracted from the seat back to be in an extracted position and retracted to the seat back to be in a retracted position; and an extracted position retaining mechanism that retains the armrest in the extracted position when the armrest is extracted from the seat back to limit an angle of the armrest with respect to the vehicle body to be in a predetermined range while the backrest angle of the seat back is changed. The extracted position retaining mechanism includes: a rotation shaft that extends in the seat width direction; a link member that is coupled with the vehicle body to be swingable around the rotation shaft, the link member having a long hole that extends in a longitudinal direction of the link member; and a pin that is arranged in a position away from the support shaft of the armrest in a radial direction of the shaft, the pin being inserted in the long hole. The extracted position retaining mechanism operates to: allow the pin to slide along the long hole as the armrest is moved from the retracted position to the extracted position and to abut an end of the long hole to limit the extracted position of the armrest; and allow the pin to the press the link member to rotate in a direction to separate the pin from the end of the long hole when the seat back is tilted rearward to change the backrest angle, whereby the link member allows the armrest to further be extracted to a position where the pin abuts the end of the long hole to retain the extracted position.

DETAILED DESCRIPTION

Hereinafter, an illustrative embodiment of the present disclosure will be described with reference to the accompanying drawings.

Figure 1:
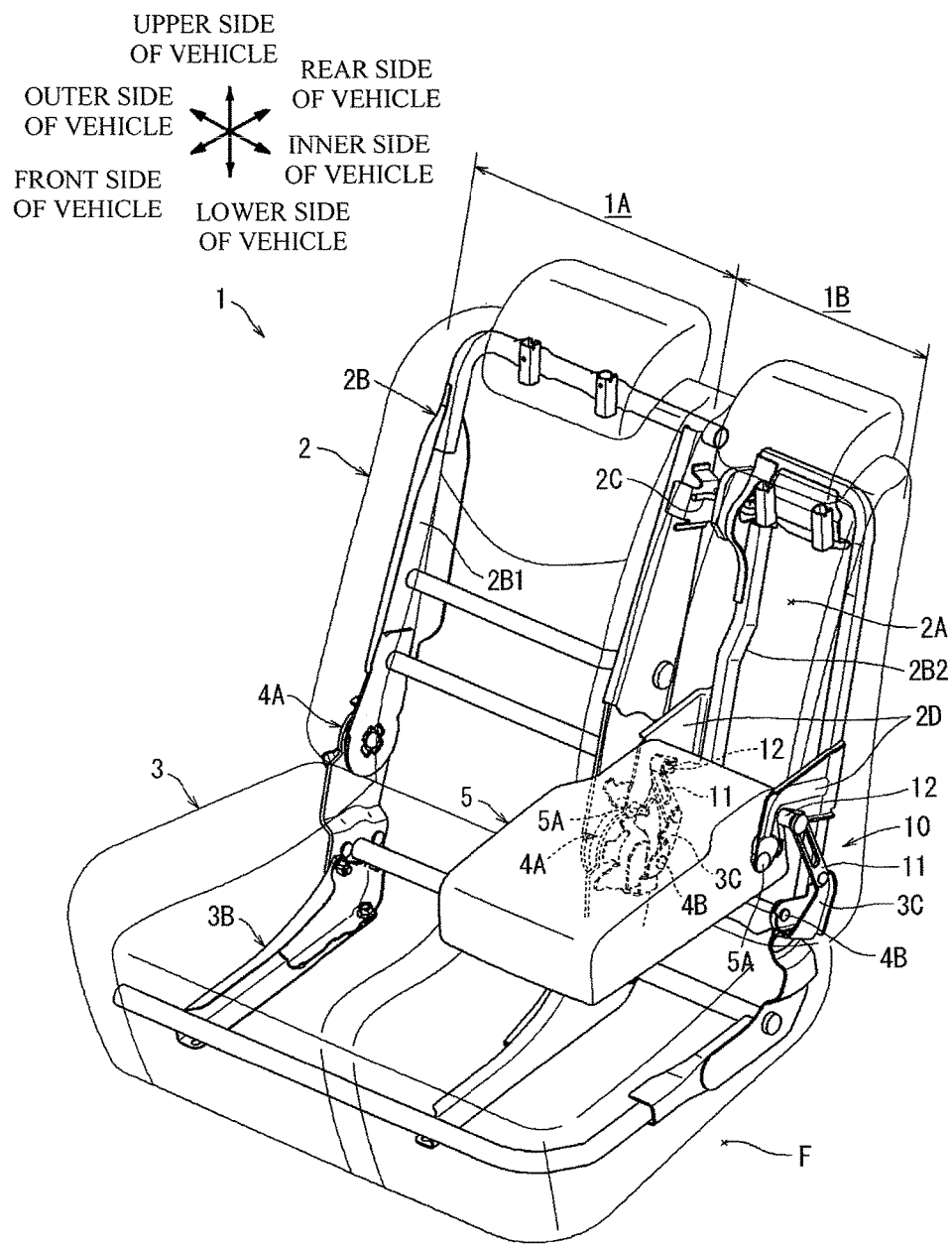
FIG. 1 is a perspective view showing a brief structure of a vehicle seat according to an embodiment of the present disclosure.

A structure of a seat 1 according to an embodiment of the present disclosure is described with reference to FIGS. 1 to 10. As shown in FIG. 1, the seat 1 according to the embodiment is structured as a rear seat (right side seat) in a passenger car. The seat 1 is a so-called bench seat, which has a region 1B as a central seat of a narrower lateral width between the seat 1 and a left side seat (not shown) in a same row. The seat 1 includes a seat back 2 serving as a backrest for an occupant, and a seat cushion 3 serving as a sitting part.

The seat back 2 is equipped with an armrest 5 in the region 1B of the central seat, which is configured to be switched to an extracted state in which the armrest 5 is tilted forward and down to be used as an elbow-rest when there is no occupant sitting in the region 1B. The right and left parts of the armrest 5 are pivotally coupled to the right and the left parts of the region B1 of the seat back 2 via a support shaft 5A that extends in a seat width direction. Thus, the armrest 5 is coupled with the region B1 of the central seat of the seat back 2, so the armrest 5 is extractable and retractable through pivotal pull-up and lay-down about the support shaft 5A.

The armrest 5 is configured to be pivotable between an extracted position and a retracted position. In the extracted position, the armrest 5 is tilted forward toward the front of the seat back 2 to have an angle of a substantially horizontal level. In the retracted position, the armrest 5 is tilted rearward to an angle at which the armrest 5 is pressed into a recess 2A in the region 1B of the central seat. The armrest 5 is extracted and retracted as a user pulls the armrest 5 forward or pushes the armrest 5 rearward while the armrest 5 is grabbed by the user. Pivotal pull-up and lay-down between the extracted position and the retracted position of the armrest 5 are carried out in an angle range of more than 90 degree in a state where the seat back 2 is used at a typical backrest angle at which the seat back 2 is slightly tilted rearward.

Figure 2:
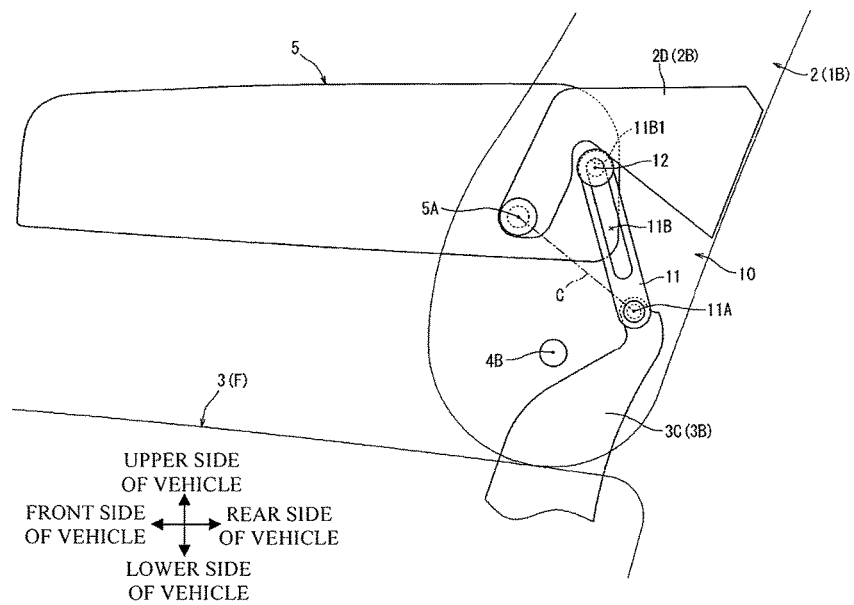
FIG. 2 is a lateral view schematically showing an extended state of an armrest.
Figure 3:
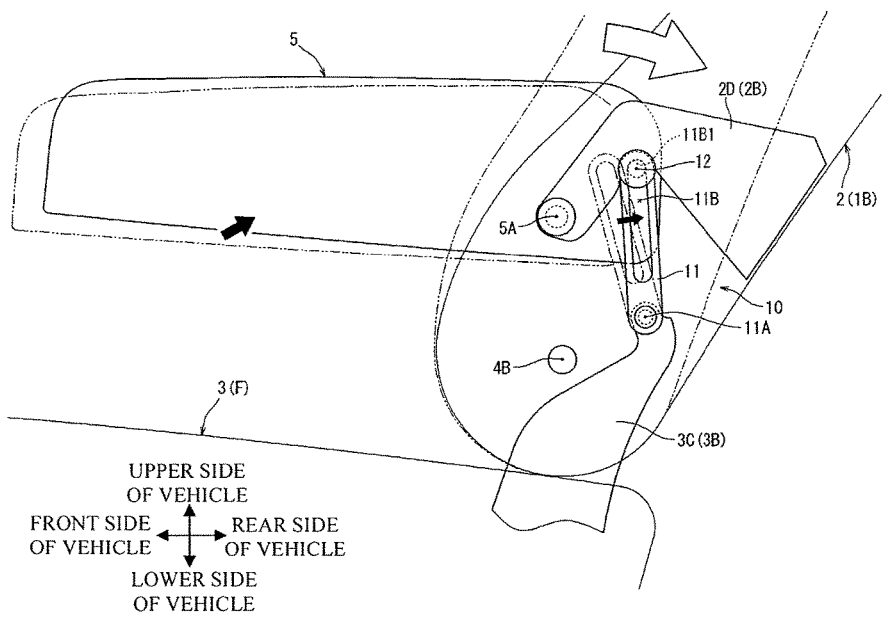
FIG. 3 is a lateral view showing the seat back changing from the state shown in FIG. 2 to a rearward tilted state.

As shown in FIG. 2, the armrest 5 is extracted to the front side of the seat back 2. The movement of the armrest 5 is stopped by an extracted position retaining mechanism 10 (described later) when the armrest 5 tilts down to a substantially horizontal angular position. The extracted position retaining mechanism 10 is arranged at a position between the armrest 5 and a rear end of the seat cushion 3. As shown in FIGS. 2 to 3, the extracted position retaining mechanism 10 is configured to keep retaining the armrest 5 at a state in which the movement toward extracting direction is limited at a position at which the armrest 5 is extracted forward to an angle that is substantially horizontal, even if the backrest angle is adjusted rearward and forward within the angle range where the seat back 2 is tilted rearward to be used as a backrest. That is, the extracted position retaining mechanism 10 always retains the extracted position of the armrest 5 in a substantially horizontal angular position in accordance with the movement of the seat back 2 to adjust the backrest angle of the seat back 2.

The detailed structure of the extracted position retaining mechanism 10, together with a basic structure of the seat 1, will be described in detail. First, the basic structure of the seat 1 will be described. As shown in FIG. 1, the seat 1 is configured that a lower end of the seat back 2 is coupled with the rear end of the seat cushion 3 installed on the floor F via a recliner 4A to be in a state where the backrest angle is adjustable through the recliner 4A. The floor F is equivalent to the "vehicle body" of the present disclosure.

In the seat back 2, a back frame 2B as the frame of the seat back 2 is divided into two parts, a body frame 2B1 and a sub-frame 2B2. The body frame 2B1 serves as a frame for the right seat of the seat back 2 in the region 1A, and the sub-frame 2B2 servers as a frame for the central seat of the seat back 2 in region 1B. The body frame 2B1 and the sub-frame 2B2 are respectively configured to have an inverted U shape, and are usually in a state in which the body frame 2B1 and the sub-frame 2B2 are integrally coupled to each other via a locking device 2C, which is arranged between adjacent shoulders o of the body frame 2B1 and the sub-frame 2B2.

In the back frame 2, lower ends of side frames on the right and the left sides of the body frame 2B1 are coupled by a hinge with rear end of a cushion frame 3B, which serves as the frame of the seat cushion 3, via a recliner 4A that functions as a stoppable shaft device. In the back frame 2B, lower ends of the side frames on the right and left sides of the sub-frame 2B2 are pivotally coupled with the rear end of the cushion frame 3B via a shaft pin 4B that extends in the seat width direction. The recliner 4A and the shaft pin 4B are arranged to have each of rotational axis, which serve as a pivotal center, be aligned on the same axis. With hinge connection of the recliner 4A with the shaft pin 4B, the body frame 1 and the sub-frame 2B2 are configured to be rotatable together around the same axis, so the backrest angle is changed in the forward and rearward direction.

Figure 5:
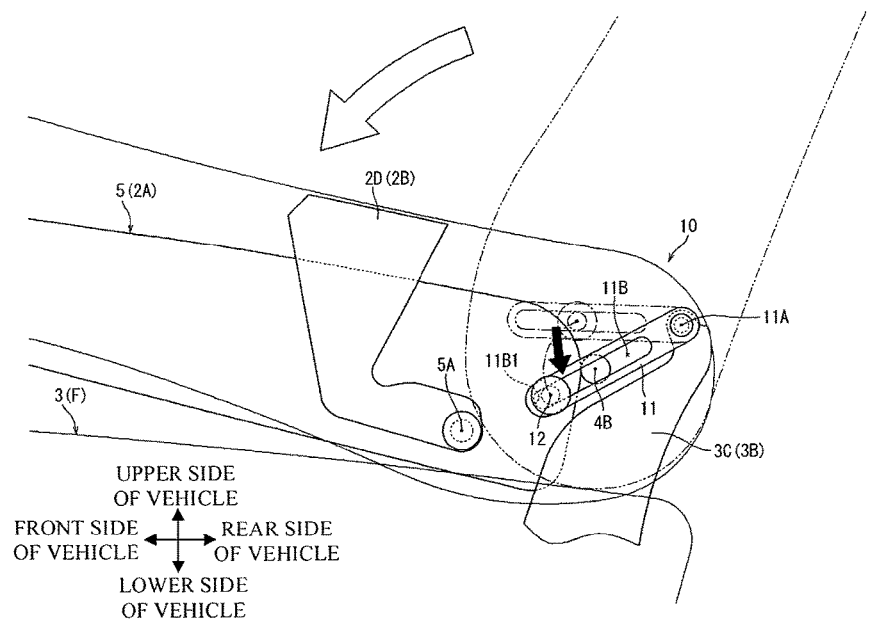
FIG. 5 is a lateral view showing a seat back in a forward tilted state.

The body frame 2B1 and sub-frame 2B2 are integrally coupled by the locking device 2C, thus the recliner 4A is locked so that the backrest angle of the body frame 2B1 is fixed, and the backrest angle of the sub-frame 2B2 is also fixed. However, the sub-frame 2B2 may be separated from the integrally coupled state with the body frame 2B1 by unlocking the locking device 2C, so that even if the backrest angle of the body frame 2B1 is fixed, the sub-frame 2B2 may be separately pivoted forward about the shaft pin 4B as the center from the body frame 2B1, to the extracted position as shown in FIG. 5.

As shown in FIG. 1, right and left sides of the armrest 5 are coupled via the support shaft 5A to the sub-frame 2B2, which is configured as described in the above. Particularly, the armrest 5 is arranged to be set between a pair of left and right support brackets 2D that are bent and extended forward and downward in a substantially L-shape from a middle part in the height direction of the side frames on the left and right sides of the sub-frame 2B2. The side parts of the right and left sides of the armrest 5 are hinged respectively with the front parts of support brackets 2D via the support shaft 5A.

According to the coupling, the armrest 5 is configured to be pivotally extracted and retracted about the support shaft 5A as the center with respect to the sub-frame 2B2. The rearward pivotal retraction of the armrest 5 is stopped at the retracted position where the armrest 5 is inserted and engaged in the recess 2A of the seat back 2. On the other hand, the forward pivotal extraction of the armrest 5 is stopped at the extracted position where the armrest 5 tilts down to a substantially horizontal angle by being blocked by a pair of left and right extracted position retaining mechanisms 10 arranged between the left and the right sides of the armrest 5 and an extension bracket 3C coupled with the rear end of the cushion frame 3B.

The extracted position retaining mechanism 10 is described in detail. Since the extracted position retaining mechanism 10 is arranged as a pair of left and right symmetrical structure, the extracted position retaining mechanism 10 arranged at an inner side of the vehicle, which is shown on the right side in FIG. 1 will be described. As shown in FIG. 2, the extracted position retaining mechanism 10 includes a link member 11 and a pin 12.

The link member 11 is formed with a straight plate-like member, one end (the lower end as shown in FIG. 2) of which is hinged with the front end of the extension bracket 3C via the shaft 11A extending in a seat width direction. A long hole 11B is formed through the link member 11 in the direction along the seat width direction (thickness direction). The long hole 11B extends straightly along the longitudinal direction (radial direction) of the link from a position adjacent to one end (the lower end as shown in FIG. 2) of the link in its longitudinal direction to a position adjacent to the other end of the link (the upper end as shown in FIG. 2).

The pin 12 is arranged to integrally protrude outward from the side of the armrest 5 in the seat width direction. Along the seat width direction, the pin 12 is inserted into the long hole 11B formed in the link member 11 and configured to be movable in the long hole 11B along the longitudinal (radial direction) direction of the link. The pin 12 is arranged in a position where the pin 12 is separated outward in the radial direction from the support shaft 5A which is the pivotal center of the armrest 5. Thus, the pin 12 slides in the long hole 11B of the link member 11 due to swinging motion of pivotal extraction and retraction of the armrest 5, and pushes the link member 11 to swing in the rotational direction.

Figure 4:
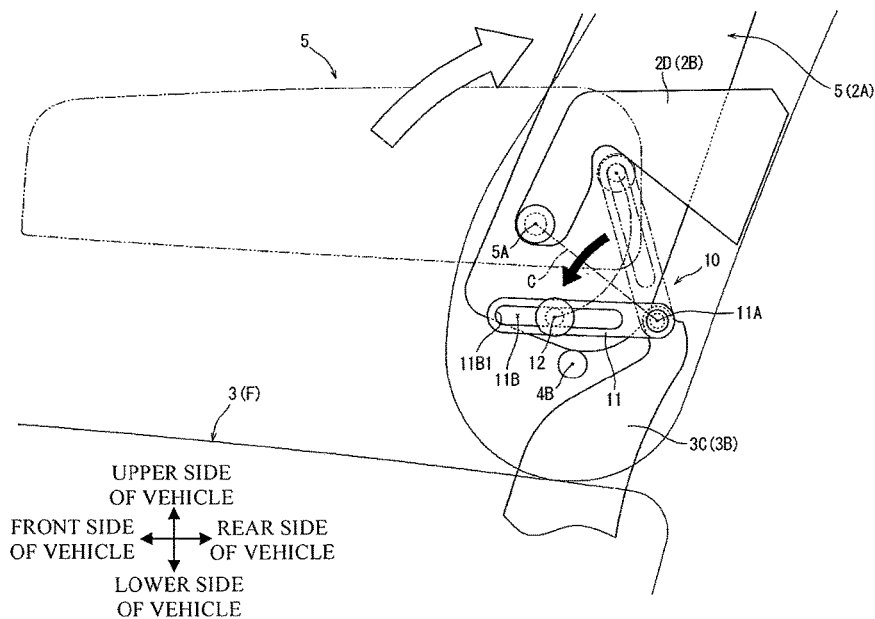
FIG. 4 is a lateral view showing the armrest changing from the state shown in FIG. 2 to a retracted state.

As shown in FIGS. 2 and 4, the pin 12 moves in the angle range between the upper rear area (see FIG. 2) and the lower area (see FIG. 4) of the support shaft 5A due to the swinging motion of the pivotal extraction and retraction of the armrest 5 in an angle range of more than 90 degree between the extracted position and the retracted position. Accompanying the swinging of the pin 12, the link member 11 swings between an angular position slightly tilted forward from an upright position (see FIG. 2) and an angular position largely tilted forward from the upright position (see FIG. 4).

As shown in FIG. 2, in a normal state where the seat back 2 is slightly tilted rearward relative to its upright position, the shaft 11A, which is the pivotal center of the link member 11, is arranged in a position closer to the upper rear side than the shaft pin 4B, which is the pivotal center of the seat back 2, and closer to the lower rear side than the support shaft 5A, which is the pivotal center of the armrest 5. The shaft pin 4B, which is the pivotal center of the seat back 2, is arranged at a substantially middle part of the lower end of the seat back 2 in the longitudinal direction. The support shaft 5A, which is the pivotal center of the armrest 5, is arranged in a position closer to the upper side than the shaft pin 4B, which is the pivotal center of the seat back 2, and adjacent to the front end of the seat back 2. As shown in FIG. 4, the support shaft 5A is arranged at the lower end of the armrest 5 when and adjacent to the front end when the armrest 5 is in the retracted state.

As shown in FIGS. 2 and 4, the pin 12 as arranged as above pivotally moves around the support shaft 5A as the center and across a segment C in accordance with the pivotal extraction and retraction of the armrest 5 the segment C connecting the support shaft 5A and the shaft 11A which is the pivotal center of the link member 11. Accompanying the pivotal movement, the pin 12 slides in the long hole 11B of the link member 11 in the extension direction of the long hole 11B, and pushes the link member 11 in the rotational direction. With the pivotal movement, the pin 12 slides along the inner side radically in the long hole 11B when approaching the segment C connecting the support shaft 5A and the shaft 11A of the link member 11, and slides along the outer side radically in the long hole 11B when leaving the segment C.

As shown in FIG. 2, in accordance with the movement of the armrest 5 toward the extracted position, the pin 12 is pushed upward pivotally with the support shaft 5A as a center to a position where the upside of the pin 12 is much above the segment C, therefore abutting the radial outer end 11B1 of the long hole 11B. Thus, the link member 11 becomes to serve as a sustaining rod for limiting the armrest 5 from being overly pivoted in the direction of extraction and retaining the armrest 5 in its extracted position after being tilting down.

The link member 11 retains the armrest 5, which is tilted to the extracted position, in a certain extracted position in a state where the backrest angle of the seat back 2 is fixed. However, as shown in FIG. 3, the link member 11 itself is pushed to rotate backward by the pin 12, since the support shaft 5A supporting the armrest 5 rotates backward about the shaft pin 4B together with the seat back 2 when the backrest angle of the seat back 2 is adjusted to tilt rearward.

However, when adjusting the backrest angle of the seat back 2 to tilt rearward, the link member 11 itself is pushed backward by the pin 12 to rise into an upright position from a forward tilted position. Thus, the orientation of the long hole 11B formed in the link member 11 also rises and changes to an upright orientation from the forward tilted orientation about the shaft 11A as the center. With this movement, the position of a radial outer end 11B1 of the long hole 11B, which is limited by the position of the pin 12, is pulled toward the upper side. Thus, the pin 12 is allowed to move upward for the amount the end 11B1 is pulled toward the upper side.

Accordingly, even if the support shaft 5A supporting the armrest 5 changes its position toward the upper rear side by rotating around the shaft pin 4B, which is the pivotal center of the seat back 2, the pin 12, as described above, is allowed to also change its position toward the upper rear side as with the support shaft 5A through the pull-up of the limiting position which accompanies the raising of the link member 11. Thus, by tilting the armrest 5 forward and downward to the extracted direction to pull up the pin 12 to that position, the relative positional relationship between the support shaft 5A supporting the armrest 5 and the pin 12 remains substantially unchanged, and the extracted position of the armrest 5 is kept to be in a substantial horizontal angular position, even when the backrest angle of the seat back 2 is adjusted rearward.

As for the backrest angle of the seat back 2, its adjustment range to retain the extracted position of the armrest 5 in a substantial horizontal angular position is set to substantially cover the whole range of the backrest angle of the seat back 2. This is because, as shown in FIGS. 2 to 3, the shaft pin 4B, which is the pivotal center of the seat back 2, the support shaft 5A, which is the pivotal center of the armrest 5, the pin 12 provided in the extracted position retaining mechanism 10, and the shaft 11A of the link member 11 are virtually linked up to serve as a four-link mechanism of a parallel link. As the four (4)-link mechanism is configured to be of a parallel link, even if the position of the support shaft 5A or the pin 12 moves due to the adjustment to the backrest angle of the seat back 2, the inclination of the segment connecting the support shaft 5A and the pin 12 to the seat cushion 3 also always remains constant. Thus, no matter which position the backrest angle of the seat back 2 is adjusted to, despite the change of the height, the extracted position of the armrest 5 may always be retained in a substantially horizontal and constant angular position.

The pin 12 is located in the middle of and inside the long hole 11B of the link member 11, when the armrest 5 is in the retracted state as shown in FIG. 4. The pin 12 slides toward the radial outer side within the long hole 11B of the link member 11, as the armrest 5 is tilted forward and down from the retracted position to an position where the seat back 2 is folded onto the upper surface of the seat cushion 3 (forward tilted position) as shown in FIG. 5. However, the pin 12 will not abut the outer end 11B1 of the long hole 11B even if the seat back 2 is tilted forward and down to the forward tilted position, but leave a gap between the end 11B1 and itself so as not to hinder the seat back 2 from tilting forward and down.

Figure 6:
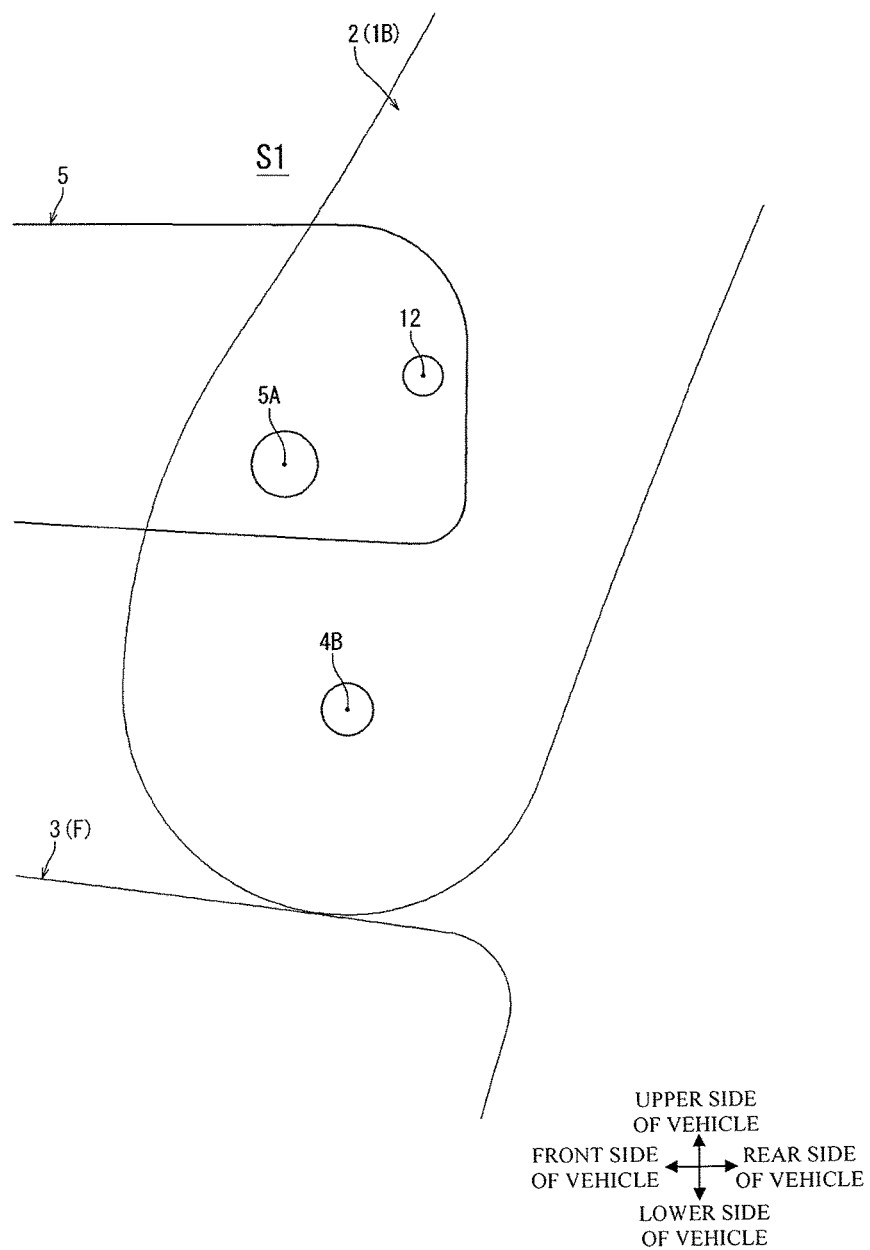
FIG. 6 is a schematic diagram showing position of pins of the armrest in the extracted state as shown in FIG. 2.

As described above, the pin 12 is arranged to abut the end 11B1 of the long hole 11B in the adjustment range of the backrest angle of the seat back 2; on the other hand, the pin 12 is not to be hindered by the end 11B1 of the long hole 11B when the seat back 2 is tilted forward and downward. To do so, the shaft 11A of the link member 11 is positioned as follows: first, as shown in FIG. 6, a state (State S1) is considered in which the armrest 5 is extracted to a substantially horizontal angular position when the seat back 2 is in any angular position; in the State S1, the positions of the support shaft 5A and the pin 12 may be arbitrarily set on the armrest 5.

Figure 7:
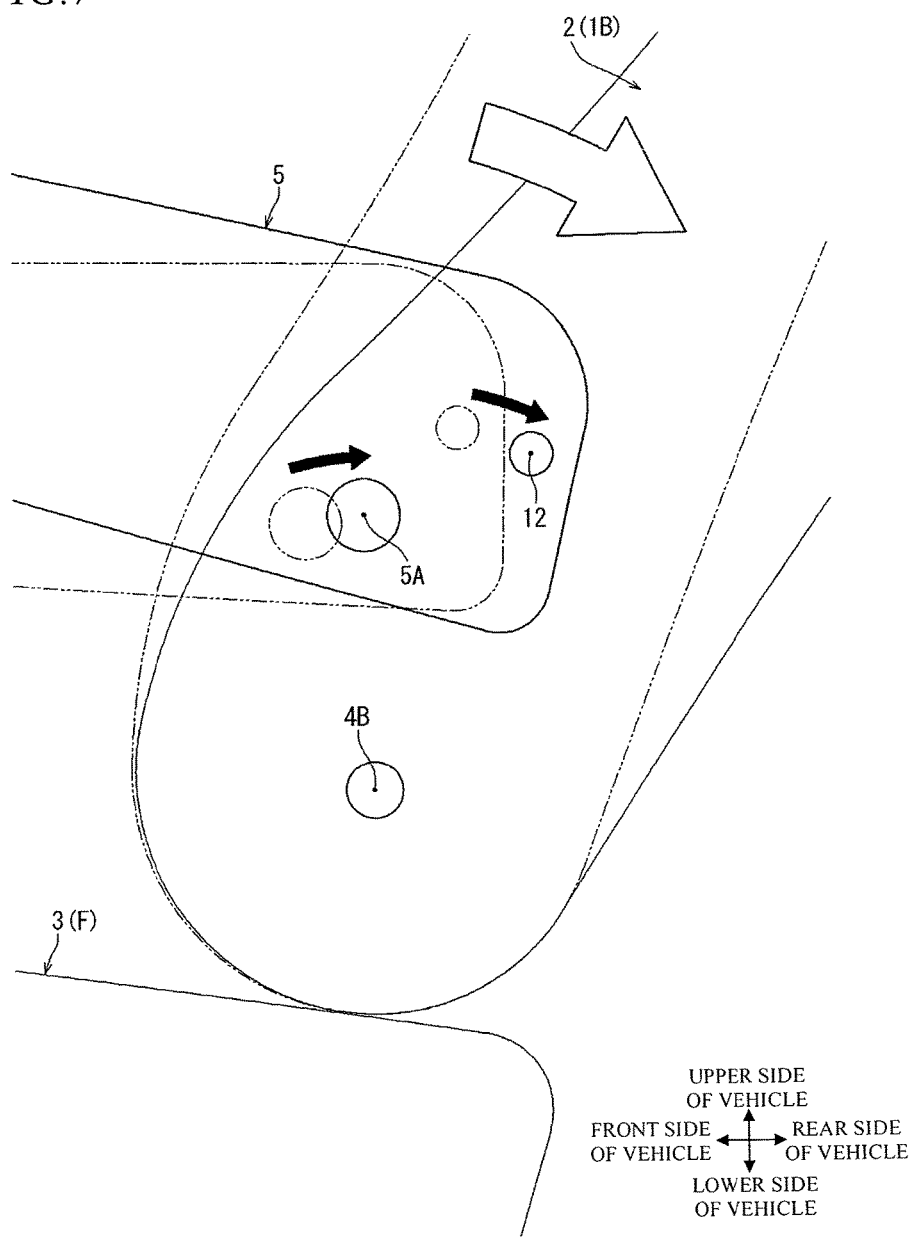
FIG. 7 is a schematic diagram showing the seat back changed from the state shown in FIG. 6 to the rearward tilted state in conjunction with the armrest.

Next, starting from the state S1, as shown in FIG. 7, the seat back 2 and the armrest 5 are tilted rearward together around the shaft pin 4B. Upon such rearward tilting, the armrest 5 becomes an upward tilted position due to the rearward tilting of the seat back 2. Accordingly, as shown in FIG. 8, the armrest 5 is corrected from the above state to a state where the armrest 5 is tilted forward and down to a substantially horizontal angle with the support shaft 5A as the pivot (state S2).

Figure 8:
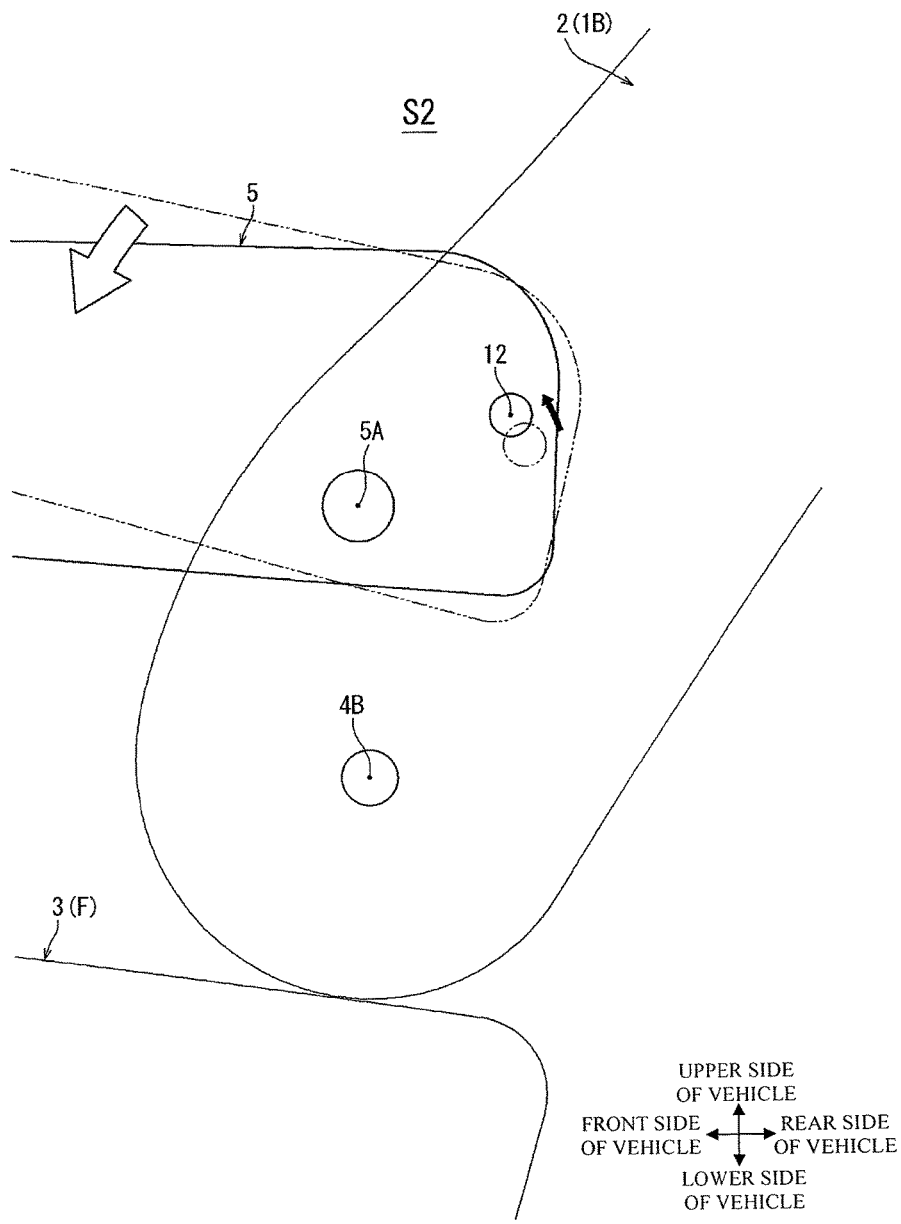
FIG. 8 is a schematic diagram showing a state in which the position of the pins of the armrest is corrected from the state shown in FIG. 7.
Figure 9:
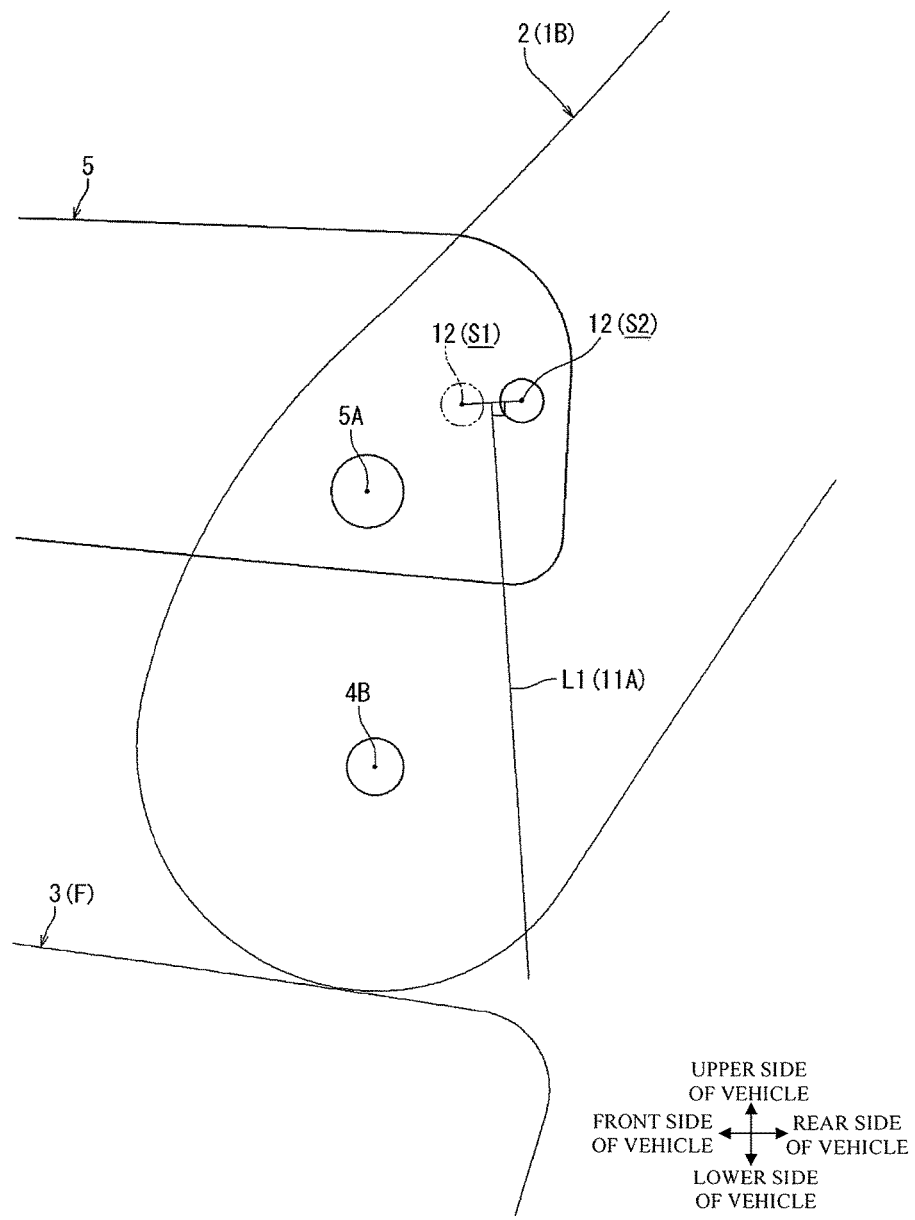
FIG. 9 is a schematic diagram showing a perpendicular bisector of line segment between the position of the pins in a state before being titled rearward as shown in FIG. 6 and the position of pins in a state after being corrected as shown in FIG. 8.

When the seat back 2 is tilted rearward as described above, the shaft 11A of the link member 11 should be positioned (see FIG. 2) so that the pin 12 may be allowed to start from the state S1 (see FIG. 6) and move as in the state S2 (see FIG. 8). Thus, next, as shown in FIG. 9, a perpendicular bisector L1 is taken of line segment between the position of the pin. 12 under the state S1 and the position of the pin 12 under the state S2. The shaft 11A of the link member 11 is positioned on this perpendicular bisector L1.

Figure 10:
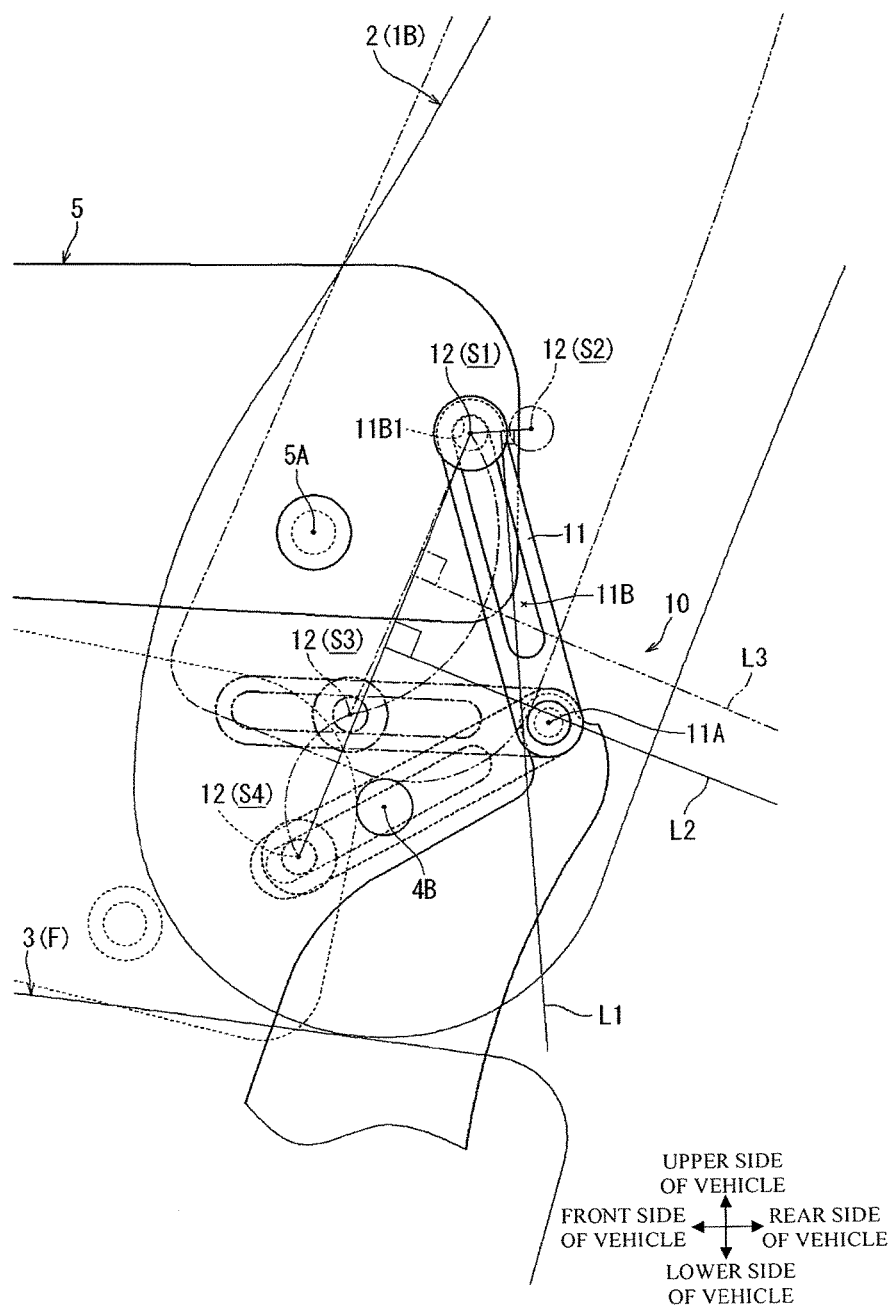
FIG. 10 is a schematic diagram showing a perpendicular bisector of line segment between the position of the pins in a state before being tilted rearward as shown in FIG. 6 and the position of the pins in a state where the seat back is tilted forward as shown in FIG. 5.

Next, as shown in FIG. 10, a perpendicular bisector L2 is taken of line segment between the following two positions: the position of the pin 12 under the state S1 and the position of the pin 12 that makes the armrest 5 change from the state S1 to the folded state (state S3) so that the seat back 2 is tilted forward and downward to the forward tilted position (state S4). By positioning the shaft 11A of the link member 11 in an area closer to the lower side than the perpendicular bisector L2, even if the seat back 2 is tilted forward and downward to the forward tilted position, it is still possible for the link member 11 to follow the rotation and prevent the outer end 11B1 of the long hole 11B from hindering the pin 12.

To sum up, the seat 1 (vehicle seat) in the embodiment 1 is configured as follows: the seat 1 includes: the seat back 2, being coupled with the floor F (the vehicle body) where the backrest angle is adjustable; the armrest 5, being coupled with the seat back 2 in a state where the armrest may be extracted and retracted through pivotal retraction and extraction about the support shaft 5A that extends along the seat width direction; and the extracted position retaining mechanism 10 that retains the armrest 5 in its extracted position for limiting the change of the angle relative to the floor F even if the backrest angle of the seat back 2 changes.

The extracted position retaining mechanism 10 includes: the link member 11 being coupled with the floor F where the link member 11 may pivotally swing around the shaft 11A that extends along the seat width direction; and the pin 12 being positioned on the support shaft 5A at the position radially separated away from the armrest 5, and inserted into the long hole 11B, which is formed in the link member 11 and extends radially. To limit the extracted position of the armrest 5, the pin 12 slides along the long hole 11B and abuts the end 11B1 of the long hole 11B as extracting the armrest 5. Even if the seat back 2 is tilted rearward, the link member 11 is pushed by the pin 12 to rotate in a manner that the end 11B1 of the long hole 11B is pulled away from the pin 12, so that the armrest 5 can be extracted to a position where the pin 12 abuts the end 11B1 of the long hole 11B and close to the extracted angle before being tilted rearward.

With such configuration, the extracted position retaining mechanism 10 may be achieved in a simple configuration that uses a link member 11 with a long hole to bridge the armrest 5 and the floor F. The extracted position retaining mechanism 10 has a configuration of high structural strength that receives the working load applied to the armrest 5 in its extracted position as a simple radial tension.

The link member 11 rotates in a manner that the link member 11 is pushed by the pin 12 due to the rearward tilting of the seat back 2 and makes the long hole 11B rise toward the rear side. The pin 12 on the rear side of the support shaft 5A on the armrest 5 is moved to the upper side to make the armrest 5 close to the extracted angle prior to being tilted rearward. With such configuration, the link member 11 may be configured to not move beyond the upper side of the armrest 5 and to have a compact and simple configuration.

As shown in FIG. 10, the shaft 11A of the link member 11 is positioned lower than a perpendicular bisector L3 of line segment between the position of the pin 12 in the extracted position of the armrest 5 (the position of the pin 12 under the state S1) and its position in the retracted position of the armrest 5 (the position of the pin 12 under the state S3). With such configuration, the pin 12 and the end 11B1 of the long hole 11B have a gap therebetween when the armrest 5 is under the retracted state so that they do not hinder each other. When the armrest 5 is extracted, the pin 12 is allowed to abut on the end 11B1 of the long hole 11B to pull up the end 11B1 of the long hole 11B as the seat back 2 tilts rearward.

The seat back 2 is configured to be tilted forward and down from an upright position to a forward tilted position (see FIG. 5). The shaft 11A of the link member 11 is positioned lower than the perpendicular bisector of line segment between the retracted position of the pin 12 when the seat back 2 is in the forward tilted position (the position of the pin 12 under the state S4) and the extracted position of the pin 12 when the seat back 2 is in the backrest angular position before being tilting downward (the position of the pin 12 under a state S1).

With such configuration, the pin 12 and the end 11B1 of the long hole 11B under the retracted state of the armrest 5 have a gap therebetween even if the seat back 2 is tilted forward and downward to the forward tilted position so that they do not hinder each other. When the armrest 5 is extracted, the pin 12 is allowed to abut on the end 11B1 of the long hole 11B to pull up the end 11B1 of the long hole 11B as the seat back 2 tilts rearward.

One embodiment of the present disclosure is explained above. However, the present invention may be implemented in other various ways. For example, the term "vehicle seat" of the present disclosure may also be applied to other seats in cars besides rear seat. In addition, it can also be applied to the seats in vehicle other than cars, such as railway cars, and be extensively applied to seats in various transportation vehicles such as aircraft or ships.

An armrest can be arranged not only as being recessed relative to a seat back, but also as a cantilever coupled with the side of a seat back. The extracted position retaining mechanism may be arranged only on the side part of one side of the armrest. The extracted position retaining mechanism may also be configured to retain the extracted position of an armrest in a non-horizontal extracted position.

The above embodiment shows, the pivotal center of the seat back(i.e. the shaft pin), the pivotal center of the armrest (i.e. the support shaft), the pin provided in the extracted position retaining mechanism, and the shaft of the link member are virtually linked up to form a four (4)-link mechanism of a parallel link. However, the above four-link mechanism is not limited to a parallel link, and can also be configured in a way that: the link member is pushed by the pin due to the rearward tilting of the seat back to rotate in a manner that the pin is pulled away from the end of the long hole.

The present invention may also be applied to the types of structures in which a seat back is not tilted downward from an upright position to a forward tilted position. The forward tilted position of the seat back is not limited to be stacked on the upper surface of a seat cushion, but may be positions where the seat back is tilted forward.

What is claimed is:

1. A vehicle seat comprising:
   a seat back configured to be coupled with a vehicle body and to have a backrest angle adjustable with respect to the vehicle body;
   a support shaft that is attached to the seat back and extends in a seat width direction;
   an armrest that is coupled with the seat back to be pivotable about the support shaft such that the armrest is pivotable between an extracted position and a retracted position with respect to the seat back; and
   an extracted position retaining mechanism that retains the armrest in the extracted position when the armrest is extracted from the seat back so as to limit an angle of the armrest within a predetermined range with respect to the vehicle body while the backrest angle of the seat back is changed,
   wherein the extracted position retaining mechanism includes:
      a rotation shaft that extends in the seat width direction;
      a link member that is coupled with the vehicle body to be swingable around the rotation shaft, the link member having a long hole that extends in a longitudinal direction of the link member; and
      a pin that is arranged in a position away from the support shaft of the armrest in a radial direction of the shaft, the pin being inserted in the long hole,
   wherein the extracted position retaining mechanism operates to:
      allow the pin to slide along the long hole as the armrest is moved from the retracted position to the extracted position and to abut an end of the long hole to limit the extracted position of the armrest; and
      allow the pin to press the link member to rotate when the seat back is tilted rearward to change the backrest angle, whereby the link member allows the armrest to further be extracted to a position where the pin abuts the end of the long hole to retain the extracted position.

2. The vehicle seat according to claim 1,
   wherein the extracted position retaining mechanism operates to:
      allow the pin to press the link member to rotate in a direction to move the long hole upward and rearward when the seat back is tilted rearward, whereby the pin positioned at a rear side of the rotation shaft of the armrest is allowed to move upward, allowing the armrest to further be extracted to a position to retain the extracted position.

3. The vehicle seat according to claim 2, wherein
   the rotation shaft of the link member is positioned lower than a perpendicular bisector of a line segment between a position of the pin in the extracted position and a position of the pin in the retracted position.

4. The vehicle seat according to claim 3, wherein
   the seat back is configured to be tilted forward and downward from an upright position to a forward tilted position, and
   the rotation shaft of the link member is positioned lower than a perpendicular bisector of a line segment between a position of the pin in the retracted position when the seat back is in the forward tilted position and a position of the pin in the extracted position when the seat back is in the backrest angle before the seat back is moved to the forward tilted position.

\* \* \* \* \*